Oct. 27, 1953          E. L. JOHNSON ET AL          2,656,640
                         LIVE BAIT CONTAINER
Filed March 17, 1952                                2 Sheets-Sheet 1
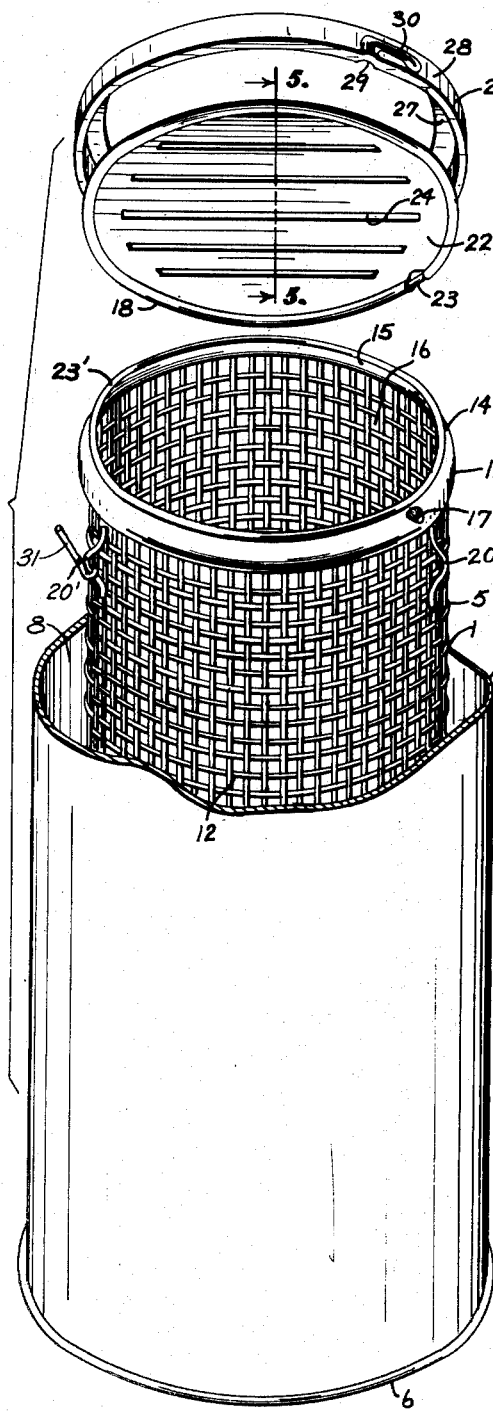
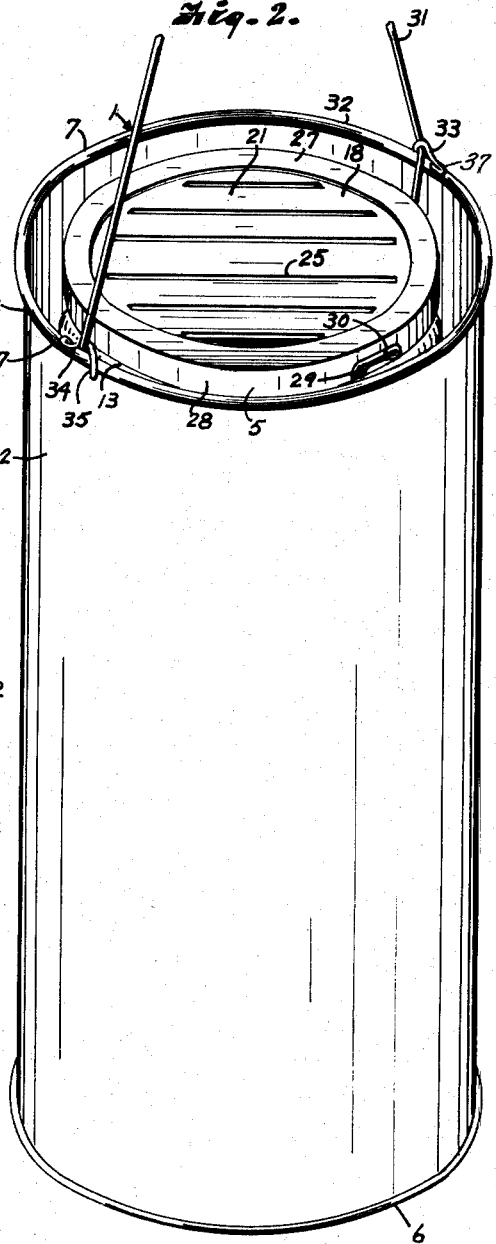
INVENTORS.
Edwin L. Johnson and
BY Emory J. Scofield
ATTORNEYS.

Oct. 27, 1953          E. L. JOHNSON ET AL          2,656,640
                         LIVE BAIT CONTAINER
Filed March 17, 1952                             2 Sheets-Sheet 2
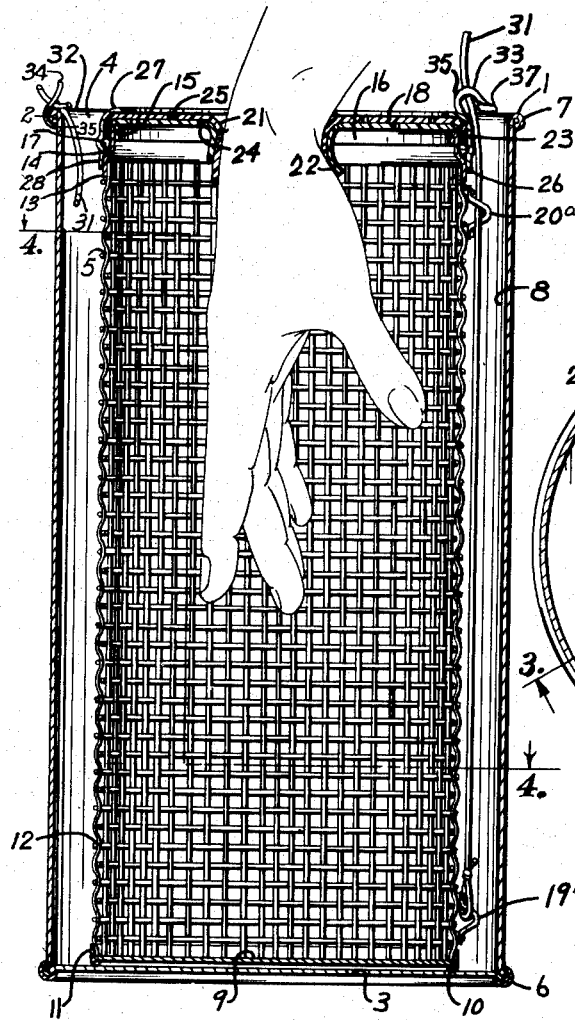
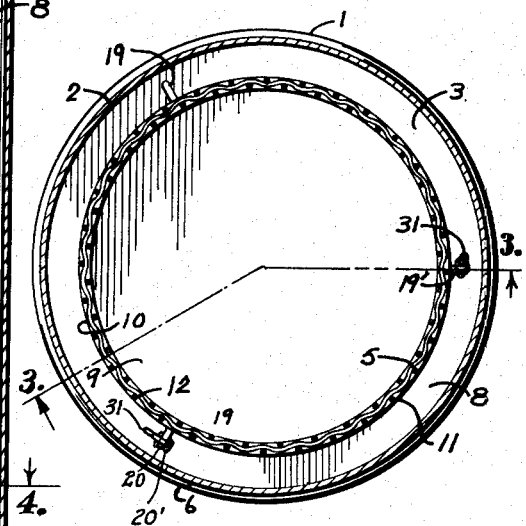
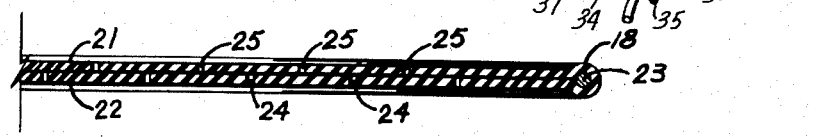
INVENTORS.
Edwin L. Johnson and
Emory J. Scofield.
BY
ATTORNEYS.

Patented Oct. 27, 1953

2,656,640

UNITED STATES PATENT OFFICE 2,656,640

LIVE BAIT CONTAINER

Edwin L. Johnson, Ottawa, Kans., and Emory J. Scofield, Cabimas, Estado Zulia, Venezuela Application March 17, 1952, Serial No. 277,053

4 Claims. (Cl. 43—56)

This invention relates to improvements in live bait containers particularly adaptable for the prevention of escape of the bait from the container when the user removes bait from the container. This application is a division of application Serial No. 721,688, filed January 13, 1947, now matured as U. S. Patent No. 2,597,002.

Attempts have heretofore been made to produce a bait box or container adapted to prevent escape of live bait therefrom, but such containers have not been entirely satisfactory.

The principal object of the present invention is therefore to provide a live bait box or container having a cover through which the hand of the user may be inserted without removing the top of the container and the top will engage the hand and arm of the user so that the bait cannot escape through the top of the container while the hand is inserted in the container.

Other objects of the invention are to provide a live bait box having an outer container with an open top; to provide a container which may be immersed in the water alongside the boat or bank of a body of water for keeping the bait in live condition; to provide a container having a perforated inner container having a cover which will prevent the water from entering directly on the bait when the container is being propelled through the water from the side of a boat or the like, thus protecting the bait; to provide means on the inner container and the outer container for attaching a bail for carrying or anchoring the bait box; to provide a removable lid on the inner container and means for retaining the lid on the container; and to provide a device of this character simple and economical to manufacture.

In accomplishing these and other objects of the present invention, we have provided improved details of structure, the preferred form of which is illustrated in the accompanying drawings, wherein:

Fig. 1 is a perspective view of our invention showing the parts in disassembled relation and the outer container broken away to better illustrate the inner container.

Fig. 2 is a perspective partly side view of the invention illustrating the top and bail for the container.

Fig. 3 is a vertical cross sectional view taken on a line 3—3, Fig. 4.

Fig. 4 is a cross section plan view taken on a line 4—4, Fig. 3.

Fig. 5 is a cross-sectional view taken on a line 5—5, Fig. 1.

Fig. 6 is a plan view of a fragment of the upper portion of the device illustrated in Fig. 3.

Referring more in detail to the drawings:

1 designates a bait container embodying the improvements of our invention comprising an outer container 2 having a bottom 3 and an open top 4 comprising a housing adapted to receive an inner perforated container 5 for the bait (not shown). While we have here illustrated the outer container 2 as substantially circular, it will be obvious that other forms may be used although we prefer an elongated container as we find they are more easily handled, particularly by the handle as here illustrated. The bottom is preferably provided with a rolled rim as indicated at 6 and the top also has a rolled rim 7 to provide added strength to the container.

The inner container 5 is slightly smaller than the outer container 2 to provide a space 8 between the walls thereof so that the outer container may hold a supply of water for the bait in the inner container. The inner container comprises a bottom 9 having rolled edges 10 and an upstanding flange 11 to which is attached by welding or other suitable means a wire screen 12 of substantially the same shape as the outer container. The upper end of the perforated container is provided with a metal flange 13 to which the upper end of the perforated wire screen is attached by welding or other suitable means. The flange 13 is tapered inwardly as indicated at 14 and the upper end rolled down as indicated at 15 (Fig. 3) to provide a stiffened rim for the open top 16 of the inner container. The flange 13 is provided with bosses 17 on its outer circumference adapted to engage a cover 18 for the inner container as will later be described.

Located near the bottom and top respectively of the inner perforated container and rigidly secured thereto are brackets 19, 19' and 20, 20' and 20a and spaced around the outer surface of the inner container which hold the inner container in spaced relation from the walls of the outer container so that the bait in the inner container will not be injured by contact against the walls of the outer container.

The cover 18 for the inner container 5 is preferably made of elastic material and is here illustrated as comprising sheets of rubber 21 and 22 vulcanized at their outer edges around a metal ring 23 (Fig. 1). The cover 18 is of a size to fit over the turned-down rim 23' of the top flange of the inner perforated container and the lower or under sheet 22 is provided with spaced slots 24 (Fig. 1) and the upper sheet 21 of the top is provided with spaced slots 25 (Fig. 2). The slots 25 are offset from the slots 24 so that they will not mate therewith as best illustrated in Fig. 5. The respective slots in the inner and outer sheets are so spaced that there will be no continuous open slots in the top 18 at any time.

A metal ring 26 is provided to fit over the cover 18 and engage the top 13 of the perforated container to retain the cover 18 on the perforated container. The ring 26 is provided with a top flange 27 and a depending flange 28. The depending flange 28 is provided with a vertical groove 29 terminating in a horizontal groove 30 forming a bayonet joint to lock the lid 18 on the container.

A bail 31 is provided having one end attached to a bracket 19' at the bottom of the perforated container and its opposite end attached to a bracket 20' at an opposite side of the top of the perforated container, said bail passing through a bracket 20a disposed immediately above the member 19' to which said bail is attached. Members 19 and 20 are not attached to the member 31 and only member 19 is shown in Fig. 4 the member 20 being disposed directly below said member 19. The upper edge 32 of the outer container 2 is provided with oppositely facing hooks 33 and 34 having one end welded or otherwise secured to the rim as indicated at 35 and their opposite ends yieldingly engaging against but not integral with the rim 32 as indicated at 37 (Fig. 2). The bail 31 engages through the hooks 33 and 34 and is adapted to retain the perforated container in the outer container and to suspend the bait box in the water to keep the bait alive when contained in the container.

If desired the inner container may be disengaged from the outer container by removal of the bail from the hooks 33 and 34 and may be carried without the outer container. The bail may be a resilient cord or other suitable material and if desired, may be swung over the shoulder of the user when wade-fishing.

In using a bait container constructed and assembled as described, the bait, such as frogs, minnows, grasshoppers or the like, may be placed in the inner perforated container 5 and when it is desired to remove the bait therefrom for use, the hand is inserted through the slots of the cover 18 as best illustrated in Fig. 3, and the rubber covering will engage the hand at all times to prevent the bait from escaping therefrom. The slots being offset in the respective sheets of the cover will provide a tight covering either when the hand is inserted therethrough or when removed therefrom.

When the device is being propelled through the water the closed top 18 will prevent direct force of water from striking the bait and prevent injury thereto.

It will be obvious from the foregoing that we have provided an improved bait container in which bait may be housed without injury during propulsion through the water on the side of a boat and one in which bait may be removed therefrom without danger of escape as with an open top container.

What we claim and desire to secure by Letters Patent is:

1. A live bait receptacle comprising, an outer container, a closed perforate container, said perforate container being located in the outer container, spaced brackets on the perforate container spacing the same from the walls of the outer container, hooks on the top rim of the outer container, and resilient means secured to the perforate container and engaging the hooks on the outer container for retaining the containers together and said resilient means being adapted to permit the immersion of the receptacle in the water.

2. A live bait receptacle comprising, an outer container, a perforate container having a cover, said perforate container being located in the outer container, brackets near the bottom and top of the perforate container spacing the same from the walls of the outer container, hooks on the top rim of the outer container, and resilient means secured to the brackets on the perforate container and engaging the hooks on the outer container for retaining the containers together and said resilient means being adapted to permit the immersion of the receptacle in water.

3. A live bait receptacle comprising, an outer container having an open top, a closed perforate container, said perforate container being located in the outer container, spaced brackets on the perforate container spacing the same from the walls of the outer container, hooks on the top rim of the outer container, and a cord having one of its free ends secured near the lower edge of the perforate container and its other free end near the upper end of the perforate container, and the loop portion of the cord engaging the hooks on the outer container for retaining the containers together, said cord being adapted to permit the immersion of the receptacle in water.

4. A live bait receptacle comprising, an outer container, a perforate container having a cover, said perforate container being located in the outer container, brackets near the bottom and top of the perforate container spacing the same from the walls of the outer container, hooks on the top rim of the outer container, and a cord having one of its free ends secured to a bracket near the lower edge of the perforate container and its other free end to an upper bracket of the perforate container, and the loop portion of the cord engaging the hooks on the outer container for retaining the containers together, said cord being adapted to permit the immersion of the receptacle in water.

EDWIN L. JOHNSON.
EMORY J. SCOFIELD.

References Cited in the file of this patent

UNITED STATES PATENTS

| Number | Name | Date |
|---|---|---|
| D. 161,816 | Blakeslee | Feb. 6, 1951 |
| 661,093 | Warren | Nov. 6, 1900 |
| 892,638 | Wilson | July 7, 1908 |